(12) United States Patent  
Ogasawara

(10) Patent No.: US 8,125,872 B2
(45) Date of Patent: Feb. 28, 2012

(54) RECORDING MEDIUM AND RECORDING SYSTEM

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 316 days.

(21) Appl. No.: 12/441,731

(22) PCT Filed: Mar. 19, 2007

(86) PCT No.: PCT/JP2007/055547
§ 371 (c)(1),
(2), (4) Date: Mar. 18, 2009

(87) PCT Pub. No.: WO2008/114388
PCT Pub. Date: Sep. 25, 2008

(65) Prior Publication Data
US 2009/0245069 A1  Oct. 1, 2009

(51) Int. Cl.
*G11B 7/00* (2006.01)
(52) U.S. Cl. .......... 369/103; 369/112.01; 369/276; 369/286; 369/94
(58) Field of Classification Search .......... None
See application file for complete search history.

(56) References Cited

U.S. PATENT DOCUMENTS

| 5,414,451 A | 5/1995 | Sugiyama et al. |
| 5,559,784 A | 9/1996 | Ota |
| 5,614,938 A | 3/1997 | Sugiyama et al. |
| 2003/0031110 A1 | 2/2003 | Ishizuka |
| 2007/0201339 A1* | 8/2007 | Yaoita et al. ............ 369/103 |

FOREIGN PATENT DOCUMENTS

| JP | 63-244316 A | 10/1988 |
| JP | 04-095237 A | 3/1992 |
| JP | 05-101398 A | 4/1993 |
| JP | 06-333259 A | 12/1994 |
| JP | 09-171622 A | 6/1997 |
| JP | 2002-312958 A | 10/2002 |
| JP | 2003-059107 A | 2/2003 |
| JP | 2004-079101 A | 3/2004 |
| JP | 2004079101 * | 3/2004 |
| JP | 2006-107606 A | 4/2006 |

\* cited by examiner

*Primary Examiner* — Joseph Haley
*Assistant Examiner* — Ifedayo Iluyomade
(74) *Attorney, Agent, or Firm* — Sughrue Mion, PLLC

(57) ABSTRACT

Disclosed herein is a recording medium on or from which the recording or reproduction of data is stably performed. On the recording medium, data are recorded three-dimensionally by the irradiation of a recording laser beam. The recording medium includes a reflection control layer including a plurality of reflection layers stacked in a film thickness direction, each reflection layer having a connection terminal, each reflection layer exhibiting reflectivity and transmissivity changeable in response to an electrical signal supplied to the connection terminal and a recording layer disposed at a beam incidence side of the reflection control layer.

9 Claims, 10 Drawing Sheets

RECORDING MEDIUM AND RECORDING SYSTEM

TECHNICAL FIELD

The present invention relates to a disc having a recording layer on or from which information is recorded or reproduced by the irradiation of a light beam, a recording medium, such as an optical card, on or from which information is optically recorded or reproduced, and a recording system.

BACKGROUND ART

In recent years, an optical disc, one of the recording media, has been widely used as a means on or from which data, such as video data, audio data, and computer data, are recorded or reproduced. For example, a digital versatile disc (DVD) may be implemented by a multi-layer disc constructed in a stack structure having a plurality of recording layers, from which the reading-out of data is possible, at one side of the disc. A double-layer disc having two recording layers at one side thereof has been practically used as a reproduction-only disc.

In the reproduction-only two-layer DVD, it is possible to read out an electric signal of either a shallow recording layer or a deep recording layer from one side of the disc only by shifting the focal point of a light beam for recording (hereinafter, referred to as 'focus jumping'). The shallow recording layer is formed of a semitransparent film such that a light beam is transmitted through the shallow recording layer to read out an electrical signal of the deep recording layer. Also, the film thickness of the shallow recording layer and the material for the shallow recording layer are selected. A reflective film is used as the deep recording layer. Between the shallow recording layer and the deep recording layer is disposed an optical transmissive spacer layer exhibiting high transmissivity in a wavelength of the beam for separating the shallow recording layer and the deep recording layer from each other by a predetermined thickness.

In DVD standards, a transparent cover layer on only one recording layer of a single-layer disc, which has the only one recording layer, has a thickness of 600 μm. On the other hand, a two-layer disc is constructed in a structure in which two recording layers are located at depths of 570 μm and 630 μm from an incidence-side surface thereof, respectively, i.e., the two recording layers are arranged above and below the depth, 600 μm, of the recording layer of the single-layer DVD, such that the first recording layer is located above the depth of the recording layer of the single-layer DVD and the second recording layer is located below the depth of the recording layer of the single-layer DVD, while the depth of the recording layer of the single-layer DVD is disposed between the two recording layers. When the two-layer disc is divided into two parts on the basis of the thickness of the single-layer recording layer, as described above, according to the DVD standards, an object lens having a relatively small numerical aperture (NA=0.6), of a pickup optical system for recording and reproducing an electric signal, is designed with respect to a cover layer having a thickness of 600 μm, and a great influence is not exerted on reading out the electrical signal by the difference in depth between the first recording layer and the second recording layer corresponding to approximately ±30 μm from the single-layer recording layer, although the object lens having the small numerical aperture. Consequently, the two-layer disc is adopted. In the related art, as described above, there is adopted a construction to record data on the materials themselves of reflection layers or the materials of the recording layers opposite to the reflection layers.

Meanwhile, high density is further required for the next-generation optical disc. To this end, it is considered to construct a recording layer into a multi-layer structure and, at the same time, to increase the numerical apertures of an object lens. When an object lens having high numerical apertures is used, the amount of aberration generated by an error of the thickness of a cover layer on the recording layer is increased until it becomes impossible to read out an electric signal, with the result that it is not possible to easily reproduce data from the multi-layer recording layer of the next-generation optical disc. For this reason, there is a necessity to incorporate an optical system that is capable of adjusting the amount of spherical aberration into the pickup to perform compensation such that the aberration is not generated in response to the depth of the recording layer.

Also, a conventional optical disc having a multi-layer recording layer structure may be implanted, for example, by a multi-layer optical disc constructed in a structure in which liquid crystal layers, not a semitransparent film, are used, the recording layers and the liquid crystal layers are alternately stacked, and the respective liquid crystal layers are used as optical shutters, thereby selecting the recording layers (See Patent Document 1).

Furthermore, there is known a multi-layer optical disc constructed in a structure in which layer recognition members (for example, formed such that a cholesteric liquid crystal encapsulated in a thin-film type transparent hollow member) are disposed adjacent to the respective recording and reproduction layers of the multi-layer optical disc (See Patent Document 2). Also, pairs of electrodes are disposed such that each layer recognition member is disposed between each pair of electrodes, and intermediate layers are disposed to separate the stacked layers from each other.

Patent Document 1: Japanese Patent Application Publication No. S63-244316

Patent Document 2: Japanese Patent Application Publication No. 2004-79101

DISCLOSURE OF THE INVENTION

Problem to be Solved by the Invention

In the conventional optical disc constructed in the multi-layer structure, the selection of the recording layer is performed using the liquid crystal, and the liquid crystal layers and the recording layers make pairs to construct the multi-layer structure. As a result, the thickness of the optical disc increases, and an aberration is generated in response to the stack depth of the liquid crystal layers and the recording layers. Consequently, there is a necessity to compensate for the aberration.

Therefore, the present invention has been made in view of the above problems, and it is an object of the present invention to provide a recording medium on or from which the recording or reproduction of data is stably performed and a recording system.

Means for Solving the Problem

In accordance with an aspect of the present invention, the above and other objects can be accomplished by the provision of a recording medium on which data are recorded three-dimensionally by their radiation of a recording laser beam, the recording medium including a reflection control layer including a plurality of reflection layers stacked in a film thickness direction, each reflection layer having a connection terminal, each reflection layer exhibiting reflectivity and transmissivity changeable in response to an electrical signal supplied to the connection terminal, and a recording layer disposed at a beam incidence side of the reflection control layer.

In accordance with another aspect of the present invention, there is provided a recording system for recording data three-dimensionally on a recording medium by the irradiation of a recording laser beam, the recording system including a retention device for movably retaining the recording medium, the recording medium including a reflection control layer including a plurality of reflection layers stacked in a film thickness direction, each reflection layer having a connection terminal, each reflection layer exhibiting reflectivity and transmissivity changeable in response to an electrical signal supplied to the connection terminal and a recording layer disposed at a beam incidence side of the reflection control layer, an optical device including an object lens for retaining the recording laser beam, such that the recording laser beam is transmitted through the recording layer and the reflection layers from a recording layer side and is then condensed, in a state in which a beam is transmitted through all the reflection layers, and a selection device electrically connected to the connection terminals of the recording medium for alternatively selecting the reflection layers to condense the recording laser beam at positions in the recording layer different in the film thickness direction.

Figure 1:
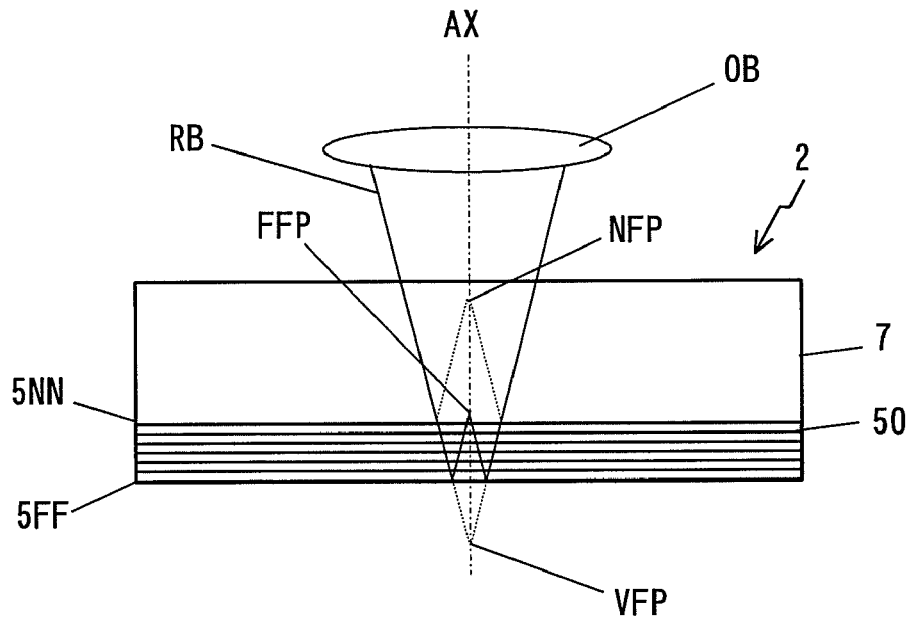
FIG. 1 is a partial sectional view illustrating a recording medium according to an embodiment of the present invention.

EXPLANATION OF REFERENCE NUMERALS 2 recording medium
5 reflection layer
7 recording layer
9 wavelength-selective reflection film
13 cover layer
11 servo guide layer
15 pinhole filter
23 pickup
50 reflection control layer
131 second cover layer

MODE FOR CARRYING OUT THE INVENTION

Now, exemplary embodiments of the present invention will be described in detail with reference to the accompanying drawings.

(Recording Medium)

Figure 2:
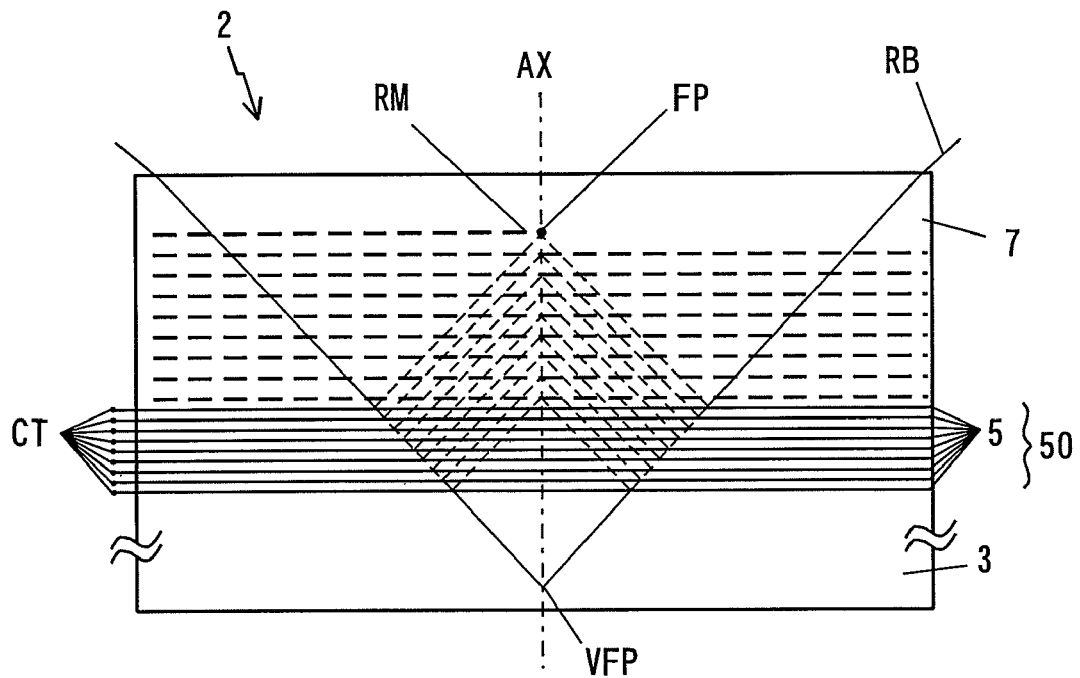
FIG. 2 is a partial sectional view illustrating a recording medium according to another embodiment of the present invention.

FIG. 1 illustrates an example of a recording medium 2 according to an embodiment of the present invention. A recording medium 2 in which data are recorded three-dimensionally by a recording laser beam RB condensed by an object lens OB includes a recording layer 7 in which data are recorded and a reflection control layer 50 for controlling reflection or transmission according to external electrical control. The recording layer 7 and the reflection control layer 50 are stacked at different areas. As illustrated in FIG. 2, for example, the reflection control layer 50 includes a plurality of reflection layers 5 stacked on a retention substrate 3 at predetermined intervals in the thickness direction of the retention substrate 3. As illustrated in FIG. 2, each reflection layer 5 includes a connection terminal CT for connection to an external control device. The reflectivity and transmissivity of each reflection layer 5 may change in response to an electrical signal supplied to the connection terminal CT. In the recording medium 2, data (recording marks RM) are recorded three-dimensionally in the recording layer 7 disposed at a beam incidence side, at a focal point FP where a reflection beam, of the recording laser beam RB, reflected by the respective reflection layers 5 of the reflection control layer 50. The recording marks RM of the recording layer 7 are multi-layered.

According to the above-stated construction, the reflection control layer 50 for selecting a depth position on an optical axis AX in the recording layer 7 and the recording layer for retaining data are located at different areas in the direction of the optical axis AS. Consequently, it is possible to freely select a material for the recording layer 7. Also, according to the above-stated construction, the reflection control layer 50 is disposed inside the recording layer 7 when viewed from the beam incidence side, and recording is performed by beams reflected by the respective reflection layers 5. Consequently, spherical aberration due to a thickness error of the recording layer is not generated from the recording laser beam, although the depth position in the recording layer 7 is selected.

As illustrated in FIG. 1, in a state (a virtual focal point VFP) in which the recording laser beam RB is transmitted through the recording layer 7 and the respective reflection layers 5, and condensed, by the object lens OB in a state in which a beam is transmitted through all the reflection layers 5, the recording layer 7 has a film thickness greater than the distance between a focal position FFP when the recording laser beam RB is reflected by one 5 FF, of the reflection layers, the farthest from the recording layer 7 and a focal position NFP when the recording laser beam RB is reflected by one 5 NN, of the reflection layers, the nearest to the recording layer 7. Consequently, when the thickness of the recording layer 7 is increased, it is possible to use the recording layer 7 as the retention substrate and to configure the recording layer 7 such that the recording layer 7 has a thickness equivalent to that corresponding to the number of the reflection layers 5. When the retention substrate is needed, it is possible to configure the recording layer 7 such that the recording layer 7 has a thickness less than that corresponding to the number of the reflection layers 5. The retention substrate 3 for retaining the reflection layers 5 illustrated in FIG. 2 may be made of, for example, glass, plastic such as polycarbonate, amorphous polyolefin, polyimide, PET, PEN, PES, etc., or ultraviolet curing acryl resin.

The recording layer 7 may be made, for example, of a material of which the refractive index, the transmissivity, the absorptivity, the reflectivity, etc. change in response to the wavelength and/or the strength of the recording laser beam RB, such that recording is performed in the material, and which is stable. For example, the recording layer 7 may be made of a photo polymer, an optical anisotropic material, a photo refractive material, an optical transmissive, a photo responsive material such as a hole burning material, a photo chromic material, an irreversibly changeable thermo chromic material, etc., or a two-photon absorption material. Transparent electrodes 51 of each reflection layer 5 may be made of indium tin oxide (ITO), indium zinc oxide (IZO), etc., which are used in a liquid crystal display, etc.

Figure 3:
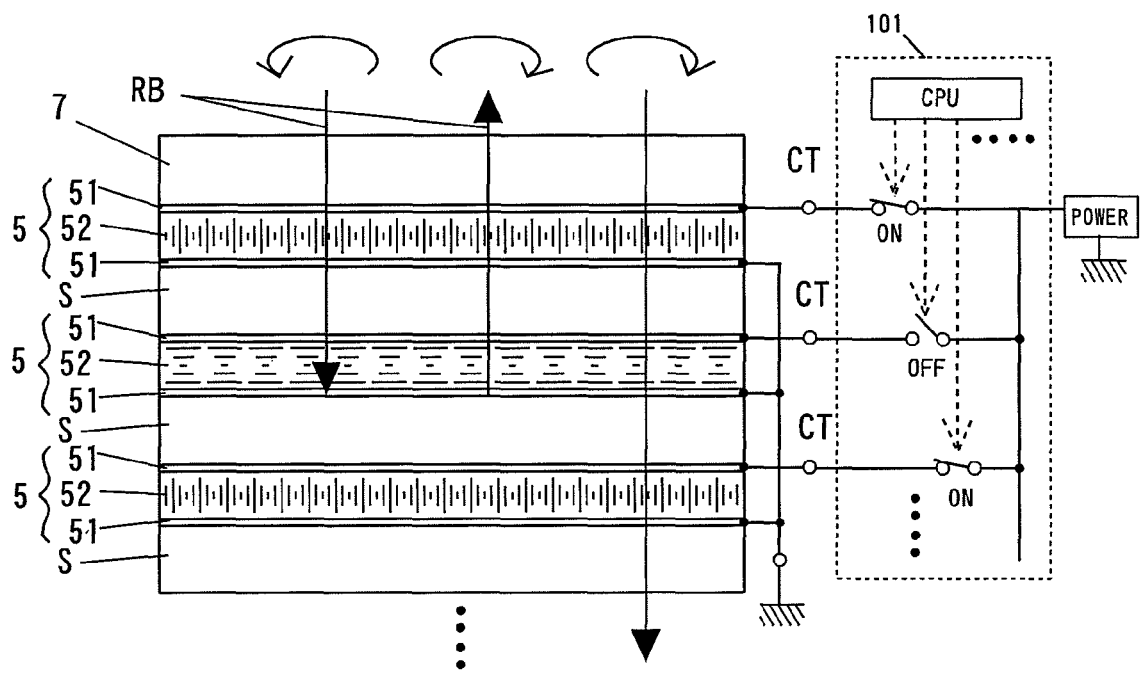
FIG. 3 is a partial sectional view illustrating a reflection control layer of a recording medium according to an embodiment of the present invention.

As an example, the reflection control layer 50 is constructed in a structure in which the respective reflection layers 5 are stacked using a cholesteric liquid crystal, as illustrated in FIG. 3.

The reflection control layer 50 is constructed in a structure in which reflection layers 5 each including a liquid crystal layer 52 having a cholesteric liquid crystal interposed between each pair of transparent electrodes 51 and spacers S made of an insulative transparent material are alternately stacked at equal intervals in the direction of the optical axis AX of the recording laser beam RB according to the number of the reflection layers necessary for the reflection control layer 50. At each pair of transparent electrodes 51, which are opposite to each other while a liquid crystal layer 52 is interposed between each pair of transparent electrodes 51, is disposed a connection terminal CT connected to a control device 101 for independently applying voltage to each pair of transparent electrodes 51. Consequently, it is possible for the control device 101 to control the transmission/reflection state (on/off state) of the respective liquid crystal layer 52. A cholesteric liquid crystal is obtained by adding several weight percent of a chiral additive (a chiral agent) to a nematic liquid crystal and forcibly twisting the nematic liquid crystal into a spiral shape. In a state in which no voltage is applied, the spiral structure of the cholesteric liquid crystal lies across, and therefore, the cholesteric liquid crystal comes into a reflection state (a planar state). When voltage is applied, on the other hand, the spiral structure of the cholesteric liquid crystal rises, and therefore, the cholesteric liquid crystal comes into a transmission state (a focal conic state). The connection structure between the connection terminals CT for applying voltage to the reflection layers 5 and the control device 101 may be configured using a technology, for example, disclosed in Japanese Patent Application Publication No. 2006-107606.

FIG. 3 illustrates a state in which a recording laser beam RB having a predetermined wavelength $\lambda$ is reflected at a circular polarization (an arrow rotating counterclockwise in the drawing) having the same rotation as the spiral structure in a planar state of the reflection layers 5 which are off by the control device 101. It is assumed that the spiral pitch of each of the cholesteric liquid crystals of the reflection layers 5 is denoted by P, the refractive index of each liquid crystal is denoted by n, and the wavelength of each liquid crystal is denoted by $\lambda$. When an optical film thickness coincides with a predetermined wavelength, i.e., when $\lambda = P \times n$ is satisfied, the predetermined wavelength $\lambda$ is strongly reflected, and the other wavelengths, i.e., polarized beams are transmitted. Also, it is not necessary to continuously apply voltage to the cholesteric liquid crystal such that the cholesteric liquid crystal has a memory property. Consequently, each of the reflection layers 5 of which the reflectivity and the transmissivity are changeable in response to electric signals supplied to the connection terminals CT is constructed in a structure including a pair of transparent electrodes 51 connected to the corresponding connection terminal CT and a liquid crystal layer 52 having a cholesteric liquid crystal interposed between the transparent electrodes 51.

A recording system according to an embodiment of the present invention includes a selection device, i.e., a control device 101, which is electrically connected to the connection terminals CT of the recording medium 2 for alternatively selecting the reflection layers 5 to condense a recording laser beam RB at positions in the recording layer 7 different in the film thickness direction of the recording layer 7.

In a recording medium 2 according to another embodiment of the present invention, it is possible to form the reflection control layer 50 of an electro chromic material that is reversibly changeable into achromatic and chromatic states by an oxidation-reduction reaction, instead of the cholesteric liquid crystal layer constructed in a structure in which the reflection layers each having the cholesteric liquid crystal 52 interposed between the transparent electrodes 51 are arranged in a multi-layered fashion in the direction of the optical axis. In this case, it is possible to configure the electro chromic material interposed between the transparent electrodes in a single layer. Alternatively, a multi-layered structure in which an electro chromic material layer, an electrolyte material, etc. are stacked is possible. It is possible for each reflection layer 5 to include a pair of transparent electrodes 51 connected to a connection terminal CT and an electro chromic layer interposed between the transparent electrodes 51. For example, a layer constructed in a structure in which a NaOH thin film is stacked on an electrolyte layer, a Pd thin film is stacked on a catalyst layer, and a MgNi thin film is stacked on an electro chromic material layer may be used as the electro chromic layer interposed between the transparent electrodes 51.

The external shape of the recording medium 2 is not particularly restricted as long as a recording laser beam having a predetermined wavelength can be condensed on a point (virtual focal point) spaced a predetermined distance from the reflection control layer in the direction of the optical axis. For example, the recording medium 2 may be formed in the shape of a disc, a card, a rectangular parallelepiped, a hemisphere, etc.

First Embodiment

Figure 4:
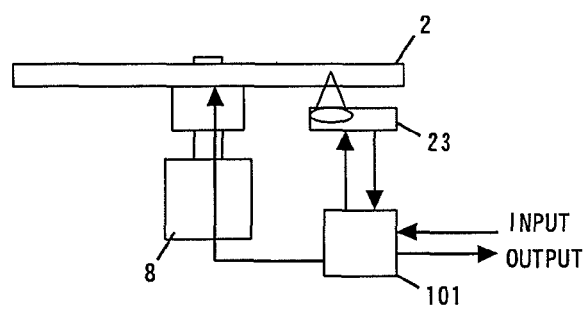
FIG. 4 is a diagram illustrating the schematic structure of a recording and reproduction system according to an embodiment of the present invention.

FIG. 4 illustrates the schematic structure of a recording medium according to this embodiment and a recording and reproduction system for performing the recording or reproduction of data on or from the recording medium.

As illustrated in FIG. 4, the recording and reproduction system includes a spindle motor 8 for retaining a disc-shaped recording medium 2 via a turntable (a retention device) to rotatably retain the recording medium 2, a pickup 23 having an object lens for irradiating a light beam for recording and reproduction to the recording medium 2, and a control device 101 for controlling the above-mentioned components. The control device 101 controls the pickup 23 based on various output data outputted from various sensors mounted in the pickup 23 and, at the same time, processes these data. According to a signal from the control device 101, the pickup 23 irradiates a light beam for recording to the recording medium 2, which is controlled to be rotated, while controlling the light beam, and records recording marks in the recording medium 2. The control device 101 obtains a signal generated from a returning portion of a light beam for reproduction from the pickup 23, decodes the obtained signal, and outputs the decoded signal.

Figure 5:
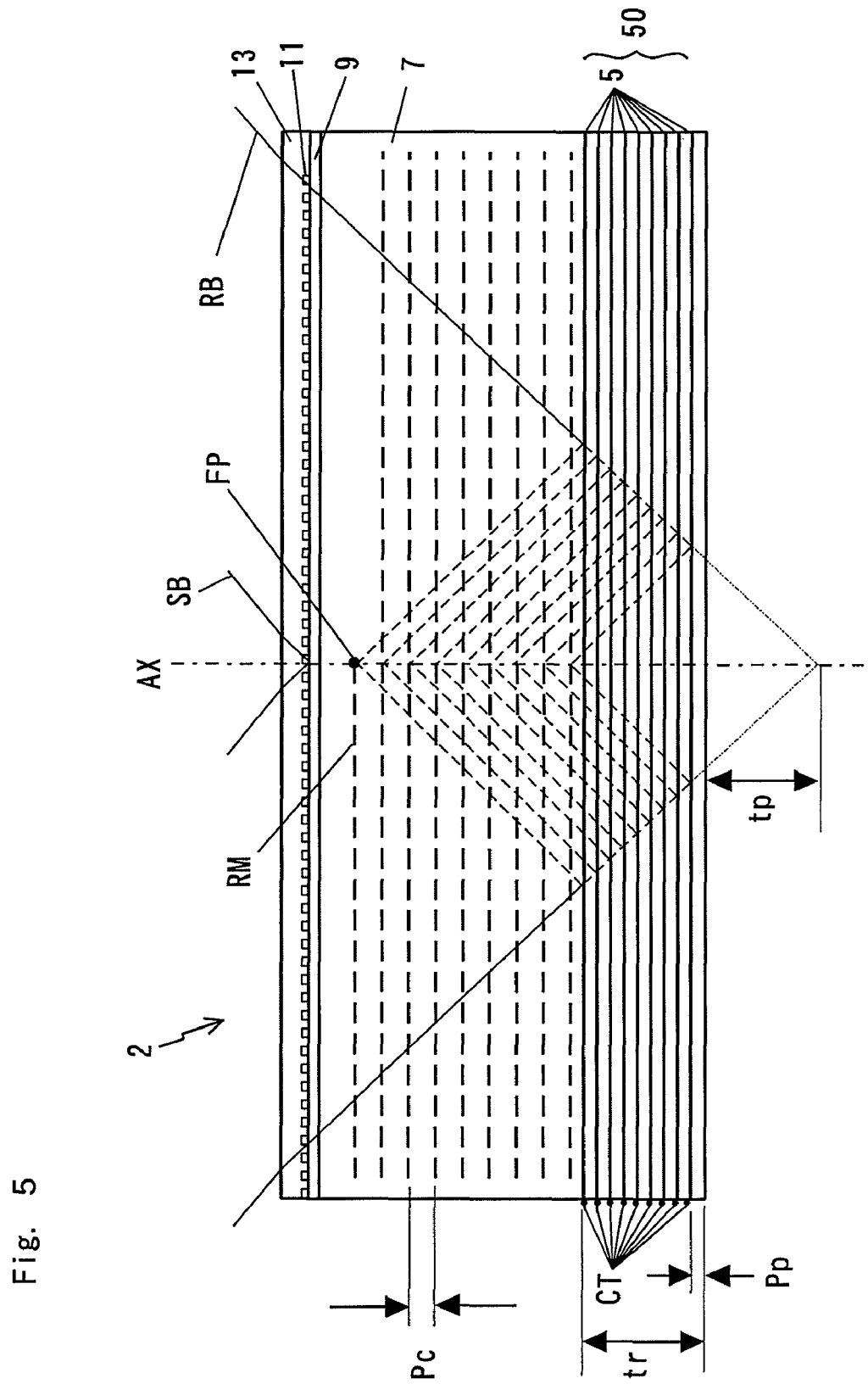
FIG. 5 is a partial sectional view illustrating a recording medium according to another embodiment of the present invention.

FIG. 5 illustrates the structure of the recording medium according to this embodiment. The recording medium includes a cover layer 13, a servo guide layer 11 in which a groove for servo is recorded, a wavelength-selective reflection film 9 for reflecting a servo laser beam SB, a recording layer 7, a reflection control layer 50 for reflecting a recording laser beam RB, and a substrate, which are sequentially disposed from a recording laser beam RB incidence side. The wavelength-selective reflection film 9 is configured to reflect a beam having a wavelength different from that of the recording laser beam RB. The reflection control layer 50 for the recording laser beam RB includes a plurality of stacked reflection layers of a cholesteric liquid crystal. The reflection control layer 50 is constructed in a structure to selectively decide the application of voltage to any one of the reflection layers 5 of the reflection control layer 50 according to an electric signal from the outside of the reflection layers 5. Via a connection terminal CT of each reflection layer 5, the control device 101 supplies a voltage signal to transparent electrodes of each reflection layer 5.

The cover layer 13 is made of an optical transmissive material. The cover layer 13 functions to flatten the stack structure and protect the recording layer 7, etc.

That is, in addition to the structure of the recording medium as illustrated in FIG. 1, the servo guide layer 11, which is disposed at a beam incidence side of the recording layer 7 is included, and the wavelength-selective reflection film 9, which reflects the servo laser beam SB having a wavelength (for example, a wavelength longer than that of the recording laser beam) different from that of the recording laser beam RB and transmits the recording laser beam RB, is disposed between the servo guide layer 11 and the recording layer 7.

Figure 6:
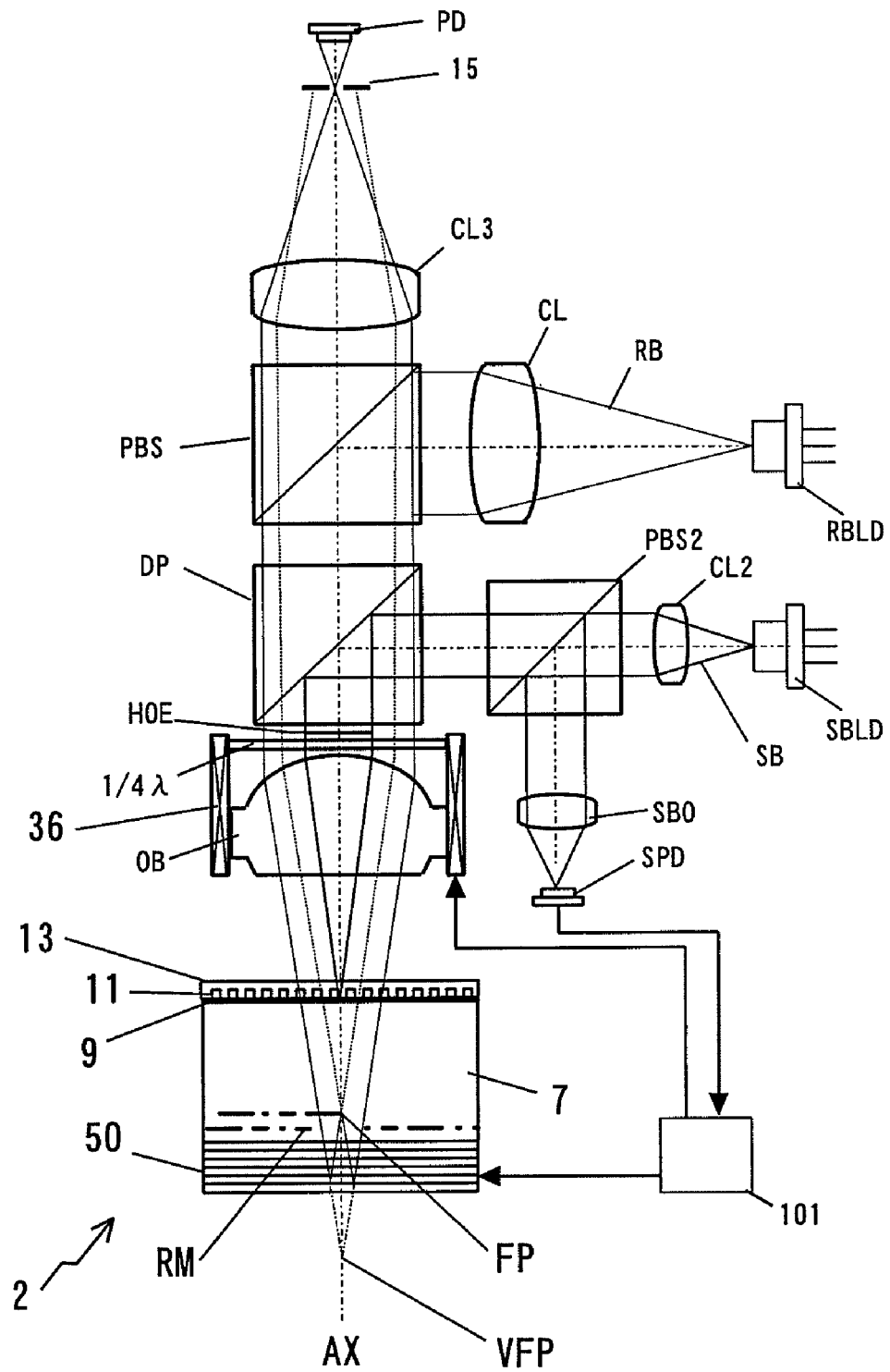
FIG. 6 is a diagram illustrating the schematic structure of a pickup according to another embodiment of the present invention.

FIG. 6 illustrates the schematic structure of a recording medium 2 and a pickup for performing the recording or reproduction of data on or from the recording medium.

In a recording system according to this embodiment, the recording medium 2 includes a servo guide layer 11. The recording system includes a servo device for controlling the relative position between the recording medium 2 and the object lens based on an electric signal obtained through the photoelectric conversion of a beam returning via an object lens OB. This recording system adopts a pickup using a servo laser SBLD for generating a laser beam having a wavelength longer than that of a recording laser RBLD.

The pickup includes a mechanism (lens actuator 36) for moving the object lens OB with respect to the recording medium 2 in the direction of an optical axis thereof (the focus direction) and in the direction perpendicular to the optical axis (for example, the tracking direction). The relative position of a condensing spot of a recording laser beam RB with respect to the recording medium 2 is adjusted by the reflection control layer 50 to condense and irradiate the recording laser beam RB to any one of the positions on the optical axis of the recording layer 7 of the recording medium 2 and record information. Also, the strength of the recording laser beam (the readout beam) is lowered, and the beam is irradiated to recording marks RM of the recording layer 7, to detect the returning beam, which is reflected, using a photo detector PD, thereby reading out recorded data.

That is, the recording and reproduction laser beam RB condensed by the object lens OB is positionally controlled by the reflection control layer 50 in multi stages, such that the beam is focused on a predetermined position in the recording layer 7 of the recording medium 2, to make the recording laser beam or the readout beam incident on the recording layer 7, whereby it is possible to independently perform the recording and/or the reproduction of an information signal. As the object lens OB is positionally controlled in multi stages in the direction of the optical axis, such that the beam is focused in the recording layer 7 of the recording medium 2, as described above, it is possible to satisfactorily perform the recording and reproduction of data on or from the recording layer 7.

In FIG. 6, there are mainly illustrated the control device and the optical pickup optical system of the optical recording and reproduction system. Although not shown, the pickup includes a position control mechanism in addition to the lens actuator 36 for focusing and tracking the condensing spot. Also, the optical recording and reproduction system includes a slider movement control mechanism for moving the entire pickup along a recording surface of the recording medium 2 and a servo mechanism for controlling the rotation of the disc-shaped recording medium. Also, the control device 101 includes a control circuit for controlling an optical source of the recording laser RBLD and the servo laser SBLD, a circuit for processing a signal detected by the photo detector PD and outputting information and an output signal, a control circuit for wholly controlling a device, such as a CPU, including a microcomputer, memory circuits, such as ROM and RAM, for memorizing data, an interface for input and output of data with an external device, etc.

In a recording operation, the recording laser beam RB is converted into a collimated beam by a collimator lens CL, is transmitted through a polarization beam splitter PBS and a dichroic prism DP, passes through a quarter-wave plate ¼λ, passes through the reflection control layer 50 by the object lens OB, is directed to a virtual focal point VFP, and is condensed on the recording medium 2.

Since the wavelength-selective reflection film 9 is disposed at a laser beam incidence side of the recording medium 2, the recording laser beam RB is not reflected but transmitted. The recording laser beam RB is transmitted through the recording layer 7, and is then incident on the reflection control layer 50. The recording laser beam RB is in a defocus state at any one of the reflection layers 5 of the reflection control layer 50, and the focal position of the recording laser beam RB is more distant than the uppermost layer of the reflection control layer 50 (tp>tr). A signal from the external control device 101 is applied to the reflection control layer 50 via connection terminals (not shown) to select transparent electrodes (to be reflected) to which voltage from the inside of the reflection layers 5 of the reflection control layer 50 is to be applied.

Through the selection of any one of the reflection layers 5, it is possible to move the focal point FP of the reflected recording laser beam RB in the direction of the optical axis AX between the reflection control layer 50 in the recording layer 7 and the servo guide layer 11.

When the distance between the object lens OB and the recording medium 2 is uniformly maintained, no aberration is generated at the condensing spot of the recording laser beam RB reflected by the reflection control layer 50 in the recording layer 7, and it is possible to move the focal point FP of the recording laser beam RB by a layer pitch Pc twice as long as a layer pitch Pp of the reflection control layer 50. As a result, although the servo guide layer 11 is not provided to the recording layer 7, it is possible to move the focal point FP of the recording laser beam RB by the decided pitch in the thickness direction of the recording layer 7, and therefore, it is possible to form recording marks three-dimensionally in the recording layer 7.

As illustrated in FIG. 6, the servo laser beam SB from the servo laser SBLD is converted into a collimated beam by a collimator lens CL2, is reflected by a polarization beam splitter PBS2 and the dichroic prism DP, and mixed with the recording laser beam RB. The servo laser beam SB, transmitted through a hologram element HOE and the quarter-wave plate ¼λ, and passes through the object lens OB, is condensed on the servo guide layer 11 of the recording medium 2.

The hologram element HOE for diffracting only the servo laser beam SB is set to locate the focal point on the servo guide layer 11 adjacent to the surface of the recording medium without aberration. The spot of the recording laser beam RB and the spot of the servo laser beam SB are set to have focal distances different from each other by the hologram element HOE. The servo guide layer 11 has a groove for servo control, which is used in a general optical disc, an address mark, etc. The servo laser beam SB reflected by the servo guide layer 11 is transmitted through a servo optical system SBO in the same manner as the general optical disc, and is then incident on a beam receiving element SPD for receiving a servo beam. It is possible to control the focus and tracking of the object lens OB by the beam receiving element SPD using a general astigmatism method and a push-pull tracking error detection method.

That is, the lens actuator 36 is driven to move the object lens OB in the focus direction and in the tracking direction by an error signal obtained through the calculation based on the output of the beam receiving element SPD according to the positioning servo control of the control device 101.

Since the control is performed such that the distance between the object lens OB and the recording medium 2 is uniformly maintained, it is possible to move the focal point FP of the recording laser beam RB in the recording layer 7 in the direction of the optical axis without aberration by changing the reflection layers 5 of the reflection control layer 50.

In a reproduction operation, a readout beam obtained by lowering the strength of a recording layer light from the recording laser RBLD is irradiated to the recording marks RM of the recording layer 7, and a reflected returning beam is detected by the photo detector PD, to read out recorded data. At this time, as illustrated in FIG. 6, the beam is condensed on a pinhole filter 15 by a collimator lens CL3, and is then irradiated on the photo detector PD. Here, the pinhole filter 15 is disposed at a position almost conjugate to the virtual focal point, and a returning beam, reflected by the reflection control layer 50, is almost condensed in a hole of the pinhole filter 15. The hole of the pinhole filter 15 disposed adjacent to the approximate condensing position of the collimator lens CL3 is set to have a size equal to or slightly greater than the diameter of the condensing spot of the collimator lens CL3, such that most of the total amount of the condensed beam is transmitted through the hole of the pinhole filter 15, a portion of the total amount of the condensed beam is shielded around the hole of the pinhole filter 15. Consequently, a beam directly returning from the recording marks RM without being reflected by the reflection control layer 50, which is one of the noise generating causes, the diameter of the condensing spot at the position of the pinhole filter 15 deviates from the focal point position, with the result that the returning beam is greatly shielded. Therefore, the returning beam having the same reflection condition as at the time of recording is satisfactorily obtained on the photo detector PD. At the same time, it is possible to restrain a returning beam from the recording marks at other levels, located above and below any recording mark RM of the recording layer 7 in the recording medium 2, by the pinhole filter 15. For this reason, it is possible to prevent an optical signal incident on the photo detector PD from being affected by the recording marks of other levels becoming cross talk.

Second Embodiment

Figure 7:
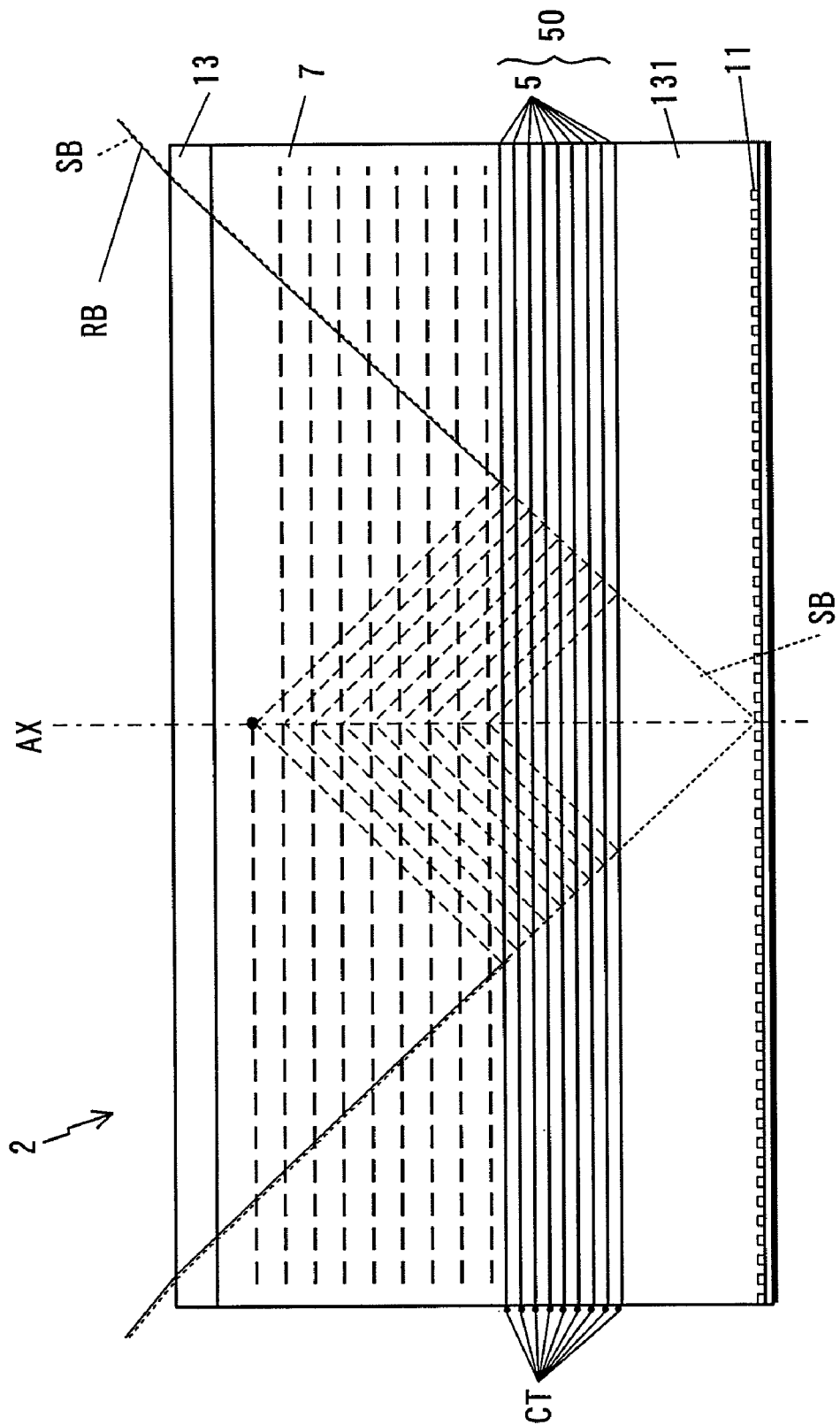
FIG. 7 is a partial sectional view illustrating a recording medium according to another embodiment of the present invention.

FIG. 7 illustrates the schematic structure of a recording medium 2 according to a second embodiment.

Figure 8:
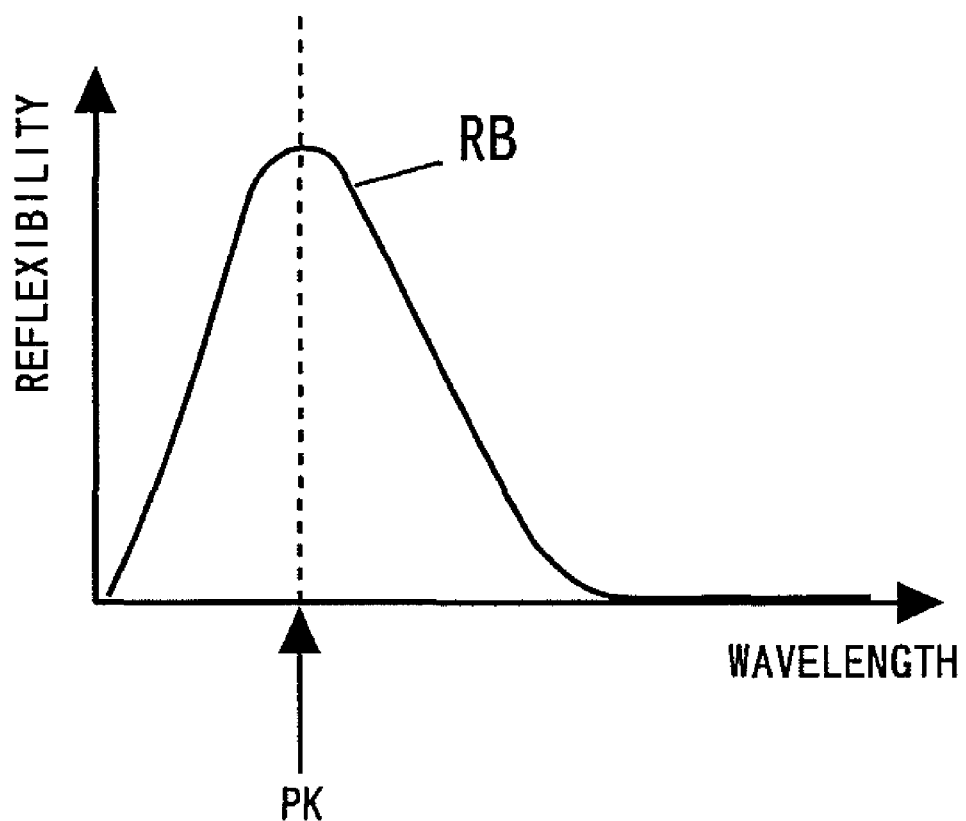
FIG. 8 is a graph illustrating the wavelength dependence in reflectivity of a reflection control layer of a recording medium according to another embodiment of the present invention.

This embodiment illustrated in FIG. 7 is constructed in a structure in which the servo guide layer 11 of the first embodiment is disposed at the innermost via a second cover layer 131 when viewed from a beam incidence side. The respective liquid crystal layers of the reflection control layer 50 are set such that the recording laser beam RB is reflected during the reflecting operation, and the wavelength of the servo laser beam SB is continuously transmitted. That is, it is assumed that the spiral pitch of each of the cholesteric liquid crystals of the reflection layers of the reflection control layer 50 is denoted by P, the refractive index of each liquid crystal is denoted by n, and the wavelength of each liquid crystal is denoted by λ, and, when λ=P×n is satisfied, the predetermined wavelength λ is strongly reflected, and the other wavelengths, i.e., polarized beams are transmitted. It is possible to control the reflectivity and the transmissivity of each liquid crystal by setting the thickness of each liquid crystal using this phenomenon. For example, according to the wavelength dependence in reflectivity of the reflection control layer set to have a predetermined thickness illustrated in FIG. 8, the reflectivity of the recording laser beam RB of the respective liquid crystal layers of the reflection control layer 50 rises when a wavelength PK becoming the maximum reflectivity obtainable in the reflection control layer is preferably set to be the predetermined wavelength λ. At the same time, it is possible to set the wavelength of the servo laser beam SB, such that the reflectivity is greatly lowered, i.e., the transmissivity is raised, although the reflection control layer is in any state. Consequently, the wavelength-selective reflection film is not needed. The second cover layer 131 is also made of an optical transmissive material. Also, the second cover layer 131 functions to flatten the stack structure and protect the recording layer 7, etc.

As described above, the servo guide layer 11, disposed at the side opposite to the recording layer 7, is included in the recording medium according to the second embodiment. The respective reflection layers 5 of the reflection control layer 50 are set to have a thickness satisfying a condition having reflectivity almost not to reflect but transmit the servo laser beam SB having a wavelength different from that of the recording laser beam RB and high reflectivity with respect to the recording laser beam RB. According to this structure, the servo laser beam SB is incident on the servo guide layer 11, located at the innermost from the beam incidence side, while not being affected by the reflection control layer 50. Since the focal points and numerical apertures NA of the servo laser beam SB may be almost equal to those of the recording laser beam RB, it is not necessary for the pickup to include an optical part, such as a hologram element, for changing the focal distance between the two beams.

Figure 9:
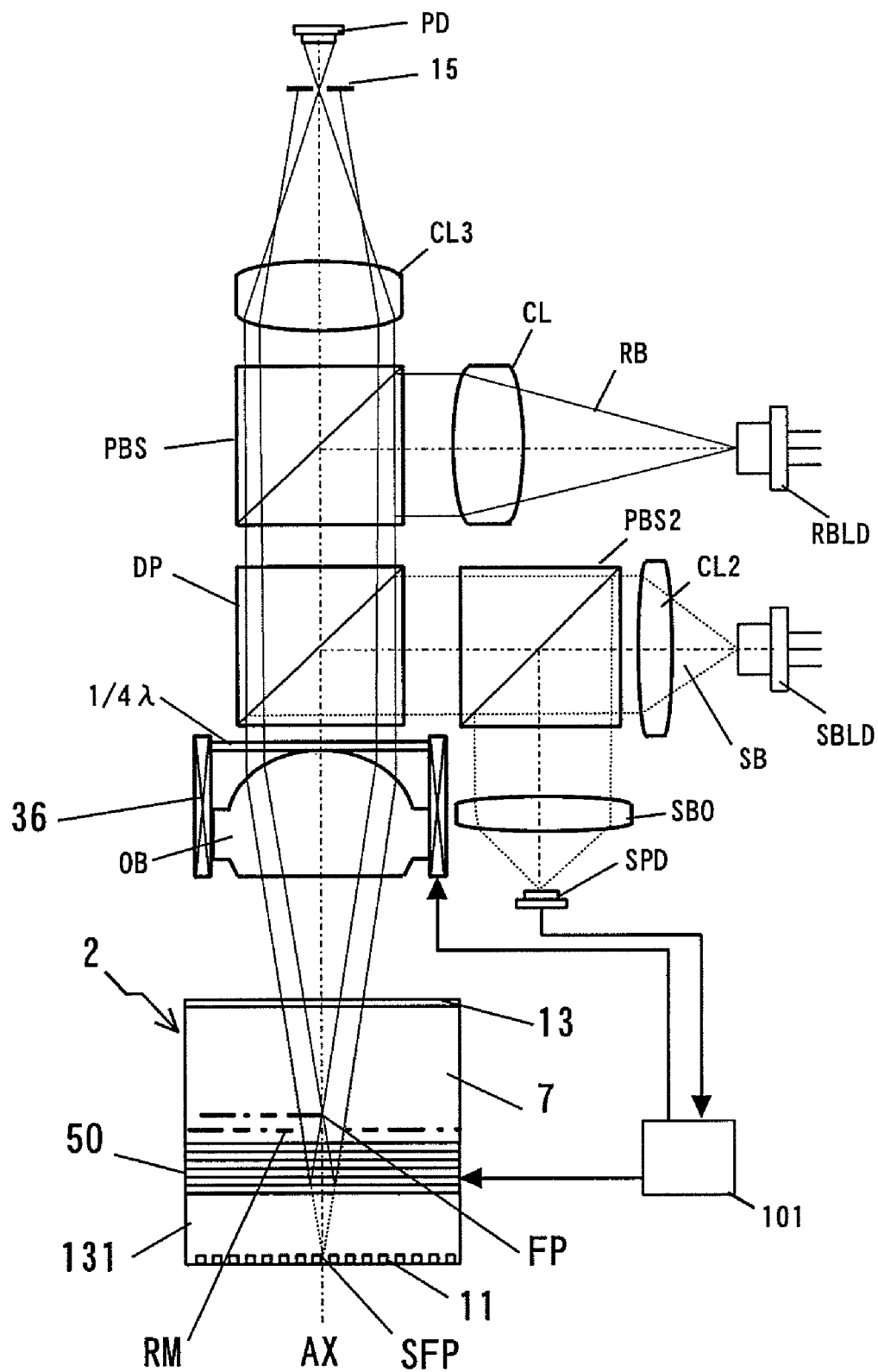
FIG. 9 is a diagram illustrating the schematic structure of a pickup according to another embodiment of the present invention.

FIG. 9 is a diagram illustrating the schematic structure of the recording medium 2 according to the second embodiment and a pickup for performing the recording or reproduction of data on or from the recording medium. The optical path of a recording laser RBLD is identical to that of the first embodiment, and therefore, a description thereof will not be given.

As illustrated in FIG. 9, the servo laser beam SB from the servo laser SBLD is converted into a collimated beam by a collimator lens CL2, is reflected by a polarization beam splitter PBS2 and a dichroic prism DP, and mixed with the recording laser beam RB. Both the beams are transmitted through the dichroic prism DP, pass through a quarter-wave plate ¼λ, pass through the reflection control layer 50 by an object lens OB, are directed to a servo focal point SFP, and are condensed on the recording medium 2. The recording laser beam RB is set such that the recording laser beam RB is reflected by the reflection control layer 50 but the servo laser beam SB is focused on the servo guide layer 11 without aberration. The servo guide layer 11 has a groove for servo control, which is used in a general optical disc, an address mark, etc. The servo laser beam SB reflected by the servo guide layer 11 is transmitted through a servo optical system SBO in the same manner as the general optical disc, and is then incident on a beam receiving element SPD for receiving a servo beam. It is possible to control the focus and tracking of the object lens OB by the beam receiving element SPD using a general astigmatism method and a push-pull tracking error detection method. Since the control is performed such that the distance between the object lens OB and the recording medium 2 is uniformly maintained through the above-described operation, it is possible to move the focal point FP of the recording laser beam RB in the recording layer 7 in the direction of the optical axis without aberration by changing the reflection layers 5 of the reflection control layer 50.

Third Embodiment

Figure 10:
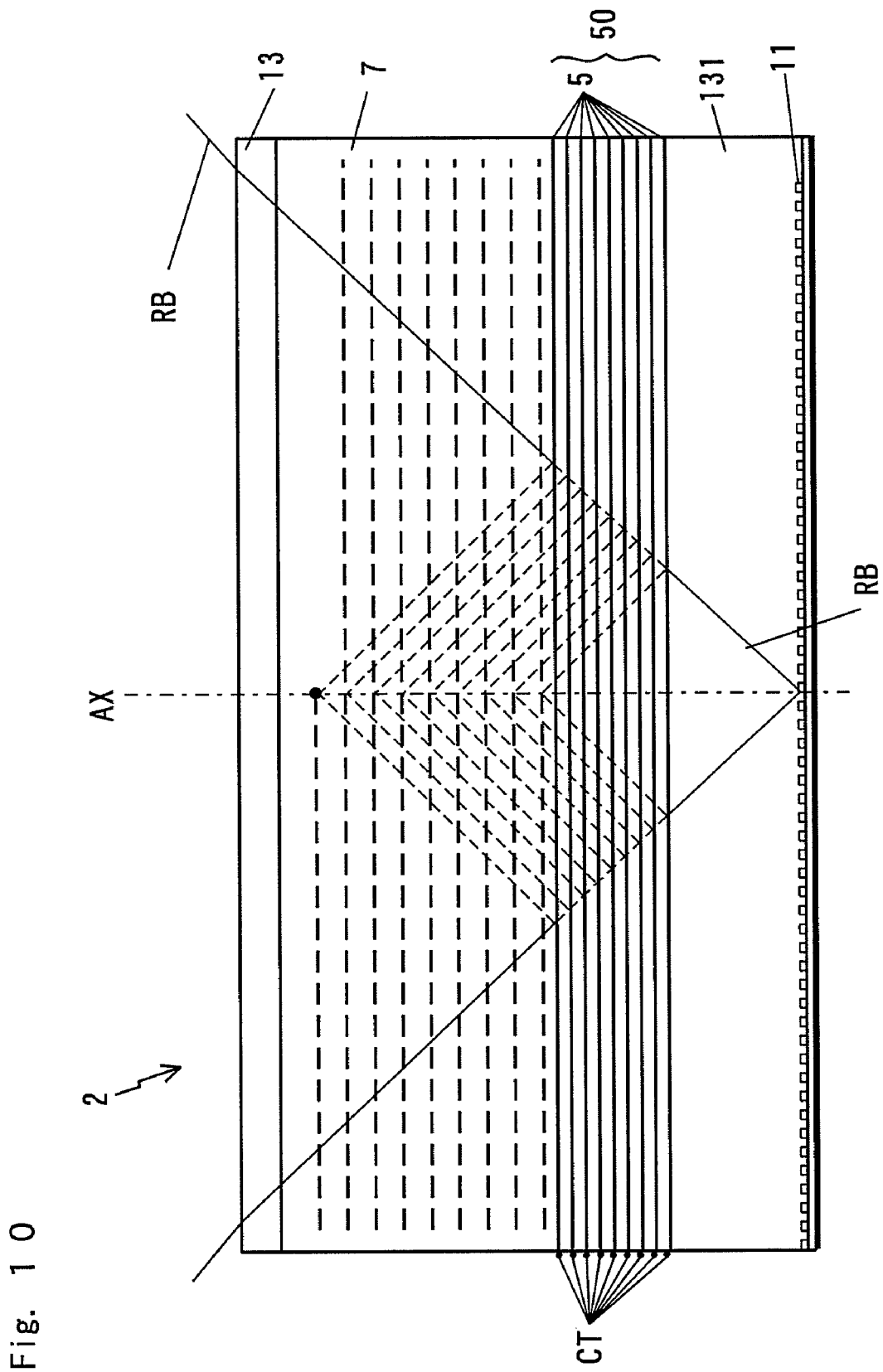
FIG. 10 is a partial sectional view illustrating a recording medium according to another embodiment of the present invention.

FIG. 10 illustrates the schematic structure of a recording medium 2 according to a third embodiment. The recording medium of this embodiment is identical to that of the second embodiment except that the reflectivity of reflection layers 5 of a reflection control layer 50 is changed.

Figure 11:
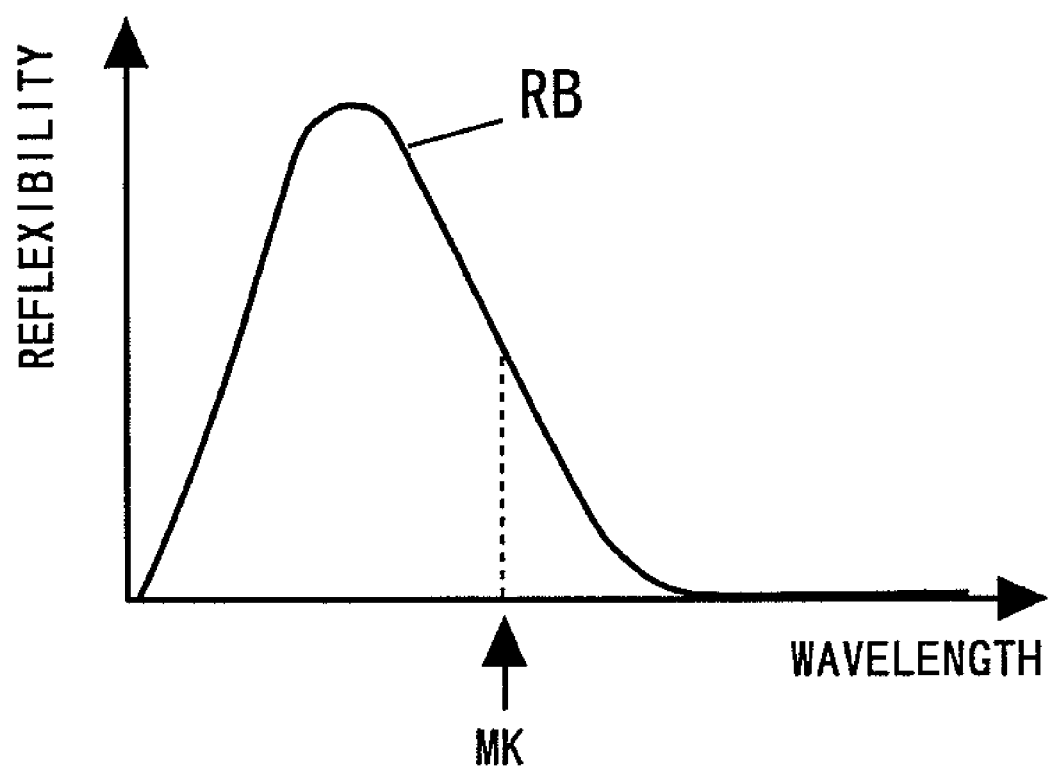
FIG. 11 is a graph illustrating the wavelength dependence of reflectivity of a reflection control layer of a recording medium according to another embodiment of the present invention.

In the recording medium 2 of the third embodiment, the thickness of each liquid crystal layer 52 is set to be between a case in which the reflectivity of the respective reflection layers 5 of the reflection control layer 50 is the highest and a case in which the reflectivity of the respective reflection layers 5 of the reflection control layer 50 is the lowest, in a reflection state. For example, according to the wavelength dependence in reflectivity of the reflection control layer set to have a predetermined thickness illustrated in FIG. 11, the reflectivity of the recording laser beam RB of the respective liquid crystal layers of the reflection control layer 50 becomes a middle level when a wavelength MK at which an intermediate reflectivity is obtainable in the reflection control layer is set to be the predetermined wavelength λ, and therefore, it is possible to obtain a transmitted beam. At the same time, it is possible to use the recording laser beam as the servo laser beam. That is, the respective reflection layers 5 of the reflection control layer 50 are set to have a thickness satisfying a condition having a reflectivity not to reflect some of the recording laser beam RB but to transmit some of the recording laser beam RB, and therefore, it is possible to configure the recording laser beam RB and the servo laser beam SB to be the same. Consequently, since it is possible for some of the recording laser beam RB to be transmitted through the reflection control layer 50 and thus to reach the servo guide layer 11, located inside the recording medium, and it is possible to perform the focus/tracking servo using the returning recording laser beam RB reflected by the servo guide layer 11, it is not necessary for the pickup to include an optical source for a servo laser beam having a wavelength different from that of the recording laser beam RB and an optical part, such as a polarization beam splitter or a dichroic prism.

Figure 12:
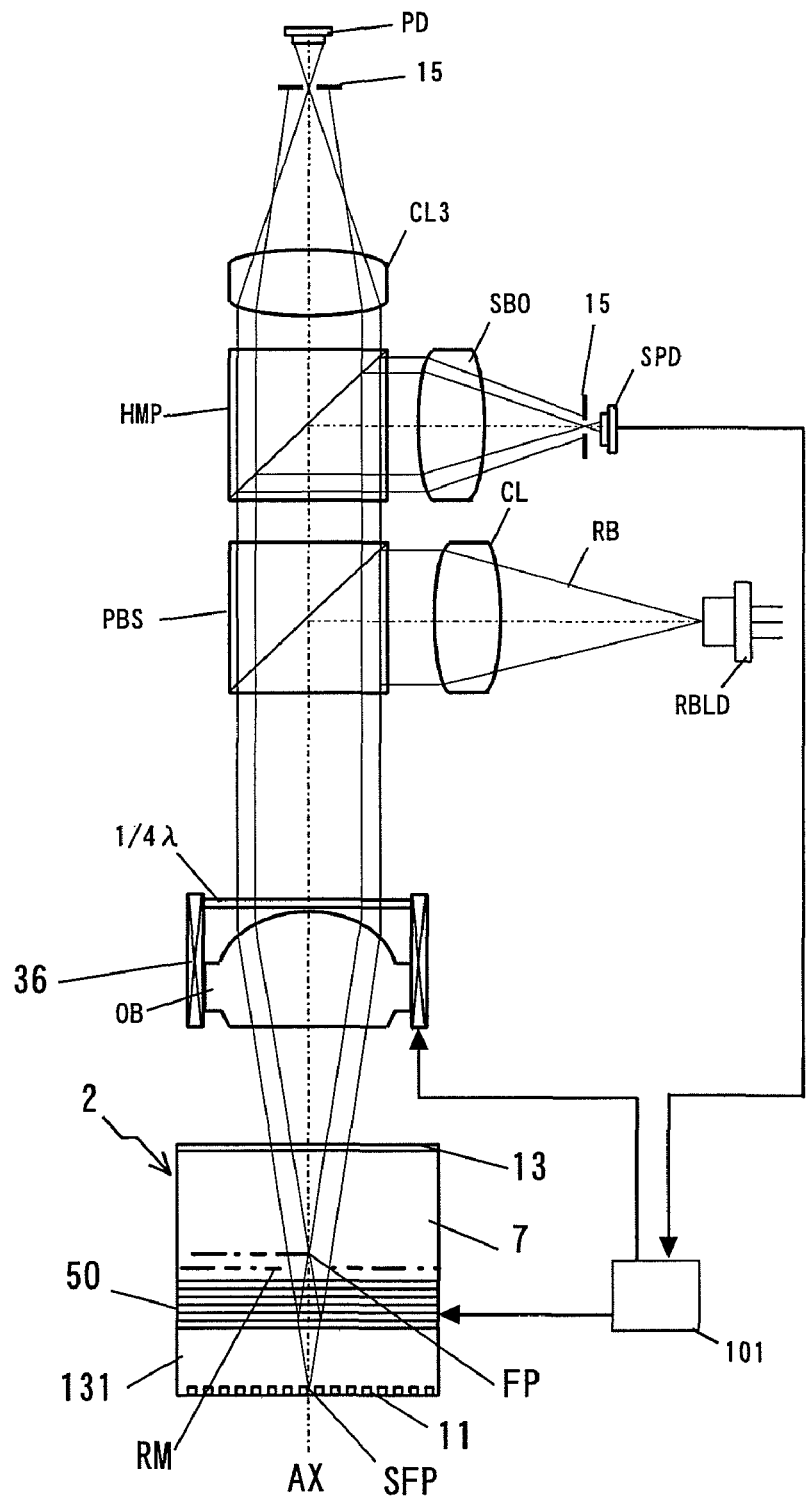
FIG. 12 is a diagram illustrating the schematic structure of a pickup according to another embodiment of the present invention.

FIG. 12 is a diagram illustrating the schematic structure of the recording medium 2 according to the third embodiment and a pickup for performing the recording or reproduction of data on or from the recording medium. The optical path of a recording laser RBLD in recording and reproduction is identical to those of the previously described embodiments, and therefore, a description thereof will not be given.

As illustrated in FIG. 12, the recording laser beam RB from the recording laser RBLD is converted into a collimated beam by a collimator lens CL2, is reflected by a polarization beam splitter PBS, passes through a quarter-wave plate ¼λ, passes through the reflection control layer 50 by an object lens OB, is directed to an servo focal point SFP, and is condensed on the recording medium 2. The recording laser beam RB is partially reflected by the reflection control layer 50, and the remaining of the recording laser beam RB is reflected by the servo guide layer 11. The reflected beam is divided by the polarization beam splitter PBS and a half mirror prism HMP. A component transmitted through a servo optical system SBO is directed to a pinhole filter 15, and is incident on a beam receiving element SPD for receiving a servo beam. It is possible to control the focus and tracking of the object lens OB by the beam receiving element SPD using a general astigmatism method and a push-pull tracking error detection method. Since the control is performed such that the distance between the object lens OB and the recording medium 2 is uniformly maintained through the above-described operation, it is possible to move the focal point FP of the recording laser beam RB in the recording layer 7 in the direction of the optical axis without an aberration by changing the reflection layers 5 of the reflection control layer 50.

The invention claimed is:

1. A recording medium on which data are recorded three-dimensionally by the irradiation of a recording laser beam, the recording medium comprising: a reflection control layer comprising a plurality of reflection layers stacked in a film thickness direction, each reflection layer having a connection terminal, each reflection layer exhibiting reflectivity and transmissivity changeable in response to an electrical signal supplied to the connection terminal; and a recording layer disposed at a beam incidence side of the reflection control layer, wherein the recording layer has a film thickness greater than a distance between a focal position when the recording laser beam is reflected by the farthest reflection layer from the recording layer of the reflection layers and a focal position when the recording laser beam is reflected by the nearest reflection layer to the recording layer of the reflection layers.

2. The recording medium according to claim 1, wherein each reflection layer comprises a pair of transparent electrodes connected to the connection terminal and a liquid crystal layer having a cholesteric liquid crystal interposed between the transparent electrodes.

3. The recording medium according to claim 2, further comprising:
a servo guide layer disposed at a beam incidence side of the recording layer; and a wavelength-selective reflection film disposed between the servo guide layer and the recording layer for reflecting a servo laser beam having a wavelength different from that of the recording laser beam and transmitting the recording laser beam.

4. The recording medium according to claim 2, further comprising a servo guide layer disposed at a side opposite to the recording layers of the reflection control layer, wherein each reflection layer of the reflection control layer is set to have a thickness satisfying a condition having reflectivity almost not to reflect but transmit a servo laser beam having a wavelength different from that of the recording laser beam and high reflectivity with respect to the recording laser beam.

5. The recording medium according to claim 2, wherein further comprising a servo guide layer disposed at a side opposite to the recording layers of the reflection control layer, wherein each reflection layer of the reflection control layer is set to have a thickness satisfying a condition having a reflectivity not to reflect some of the recording laser beam but to transmit some of the recording laser beam.

6. The recording medium according to claim 1, wherein each reflection layer comprises a pair of transparent electrodes connected to the connection terminal and an electro chromic layer interposed between the transparent electrodes.

7. The recording medium according to claim 6, further comprising:
   a servo guide layer disposed at a beam incidence side of the recording layer; and
   a wavelength-selective reflection film disposed between the servo guide layer and the recording layer for reflecting a servo laser beam having a wavelength different from that of the recording laser beam and transmitting the recording laser beam.

8. A recording system for recording data three-dimensionally on a recording medium by the irradiation of a recording laser beam, the recording system comprising: a retention device for movably retaining the recording medium, the recording medium comprising a reflection control layer comprising a plurality of reflection layers stacked in a film thickness direction, each reflection layer having a connection terminal, each reflection layer exhibiting reflectivity and transmissivity changeable in response to an electrical signal supplied to the connection terminal and a recording layer disposed at a beam incidence side of the reflection control layer, wherein the recording layer has a film thickness greater than a distance between a focal position when the recording laser beam is reflected by the farthest reflection layer from the recording layer of the reflection layers and a focal position when the recording laser beam is reflected by the nearest reflection layer to the recording layer of the reflection layers; an optical device comprising an object lens for retaining the recording laser beam, such that the recording laser beam is transmitted through the recording layer and the reflection layers from a recording layer side and is then condensed, in a state in which a beam is transmitted through all the reflection layers; and a selection device electrically connected to the connection terminals of the recording medium for alternatively selecting the reflection layers to condense the recording laser beam at positions in the recording layer different in the film thickness direction.

9. The recording system according to claim 8, wherein the recording medium further comprises a servo guide layer, and the recording system further comprises a servo device for controlling a relative position between the recording medium and the object lens, such that the recording laser beam is retained in the condensed state, based on an electric signal obtained through the photoelectric conversion of a beam returning via the object lens.

\* \* \* \* \*